Nov. 14, 1939. E. L. DIETRICH 2,179,878
FISHING TACKLE
Filed Nov. 4, 1938
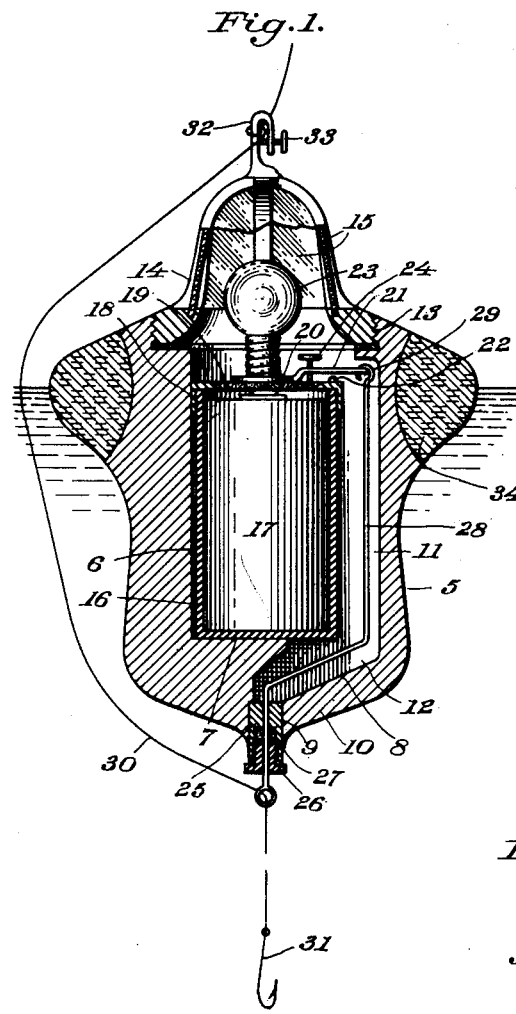
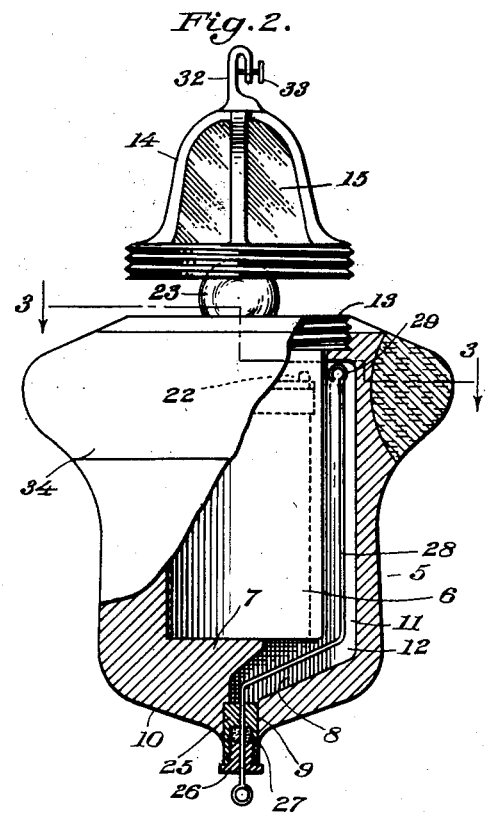
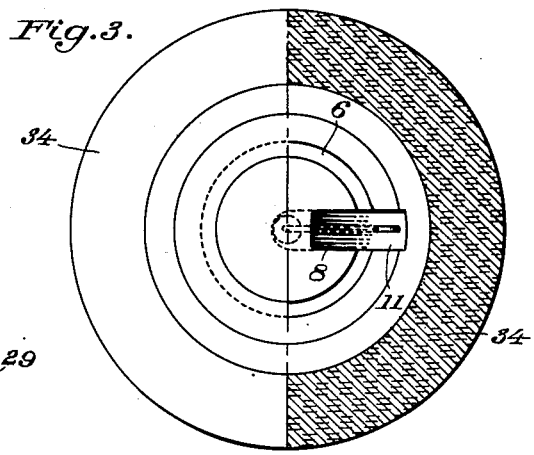
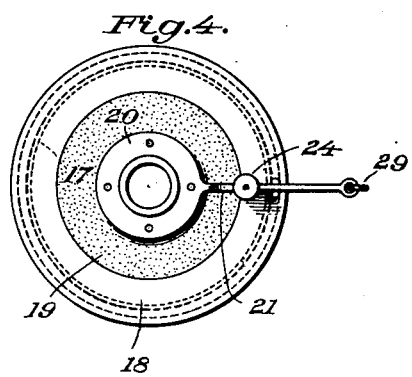
Edgar L. Dietrich:
INVENTOR
BY Victor J. Evans & Co.
ATTORNEYS Patented Nov. 14, 1939

2,179,878

UNITED STATES PATENT OFFICE 2,179,878

FISHING TACKLE

Edgar L. Dietrich, Centerport, Pa.

Application November 4, 1938, Serial No. 238,859

1 Claim. (Cl. 43—17)

My invention relates to fishing tackle and more particularly to fishing corks or floats.

One of the principal objects of my invention is to provide a float for connection within a fishing line and equipped with signal means whereby the fisherman is warned when a fish is caught on the hook of the line.

Another object of my invention is to provide a device of the above described character which is simple in construction, durable in use, efficient in operation and economical in manufacture.

Other objects and advantages will be apparent from the following description, appended claim and annexed drawing.

Referring to the drawing wherein like reference characters designate like parts throughout the several views:

Figure 1 is a longitudinal sectional view of my invention.

Figure 2 is a side elevation thereof, partly in section and illustrating the dome in detached condition.

Figure 3 is a sectional view taken on the line 3—3 of Figure 2.

Figure 4 is an enlarged top plan view of the battery case and associated parts.

In practicing my invention I provide an inverted campaniform casing 5 fashioned with a centrally disposed bore 6 closed at the bottom by a wall 7. The wall 7, adjacent one side of the bore, is formed with a downwardly and inwardly extending slot 8 terminating in a centrally disposed vertical opening 9 communicating with the bottom 10 of the casing. The wall of the bore 6, extending above the slot 8, is likewise fashioned with a slot 11 communicating with the slot 8 to provide a passage 12 for a purpose hereinafter set forth.

The upper end of the bore 6 is formed with a threaded section 13, of a larger diameter than the subjacent section of the bore 6, and has threaded therein the lower end of a dome 14 formed between the ends thereof with spaced apertures covered by glass 15 or the like. Secured within the bore 6 is a battery housing 16 containing therein a battery 17. The upper end of said housing is closed by a cover 18 threaded thereon. The cover 18 is formed with a centrally disposed portion 19 constructed of insulating material and secured on said portion 19 is an electric lamp socket 20 fashioned with a laterally extending offset resilient switch arm 21 overlying the outer edge of said cover and normally spaced above the latter. The outer edge of said cover, subjacent said arm 21, is fashioned with a contact 22 forming connection with one terminal of the battery through the medium of the battery housing.

An electric lamp 23 is secured within said socket 20, one terminal of said lamp engaging said socket and the other terminal extending therethrough and engaging the other terminal of the battery whereby, when said switch arm 21 is moved downwardly and engages the contact 22, the circuit through the battery and lamp will be closed and effect illumination of said lamp. As illustrated in Figure 1 of the drawing, the lamp bulb extends within the dome 14 and illuminates the windows therein to provide a signalling means for the fisherman. The switch arm 21 is provided with an adjusting screw 24 for engagement with the portion 19 whereby to normally maintain said arm above the contact 22.

Secured within the opening 9 at the lower end of the casing is a plug 25 having threaded therein a packing nut 26 for maintaining packing 27 within the plug and through said plug, nut and packing there is slidably mounted the lower end section of an actuating rod 28, the upper end of which is connected to the outer end of the switch arm 21 as at 29. The lower end of the rod 28 is provided with an eye to which is fixed a portion of a fishing line 30 located above the hook 31 secured on the lower end of said line. The upper end of the dome 14 is fashioned with a hook section 32 closed by an adjusting screw 33 carried thereby and through which is secured another portion of the line 30 above the eye of the rod 28. Obviously, when the line is pulled downwardly by a fish engaged on the hook 31, the rod 28 will likewise be moved downwardly causing the switch arm 21 to engage the contact 22 and illuminate the lamp 23 as heretofore set forth. The upper end of the line 30 above the hook section 32 may be carried by a fishing rod in the usual manner and upward pull on said upper end of the line will raise the casing together with the lower end of the line out of the water and permit landing of the fish. The upper end of the casing is fashioned with an exteriorly circumferentially extending groove in which is mounted a ring 34 constructed of floatable material, for instance cork, whereby to effect floating of the device when in the water.

From the foregoing it will be apparent that I have provided a simple and efficient device equipped with a visual signal means whereby a fisherman may be notified when a fish is caught on the hook of the line.

It is to be distinctly understood that various changes and modifications may be resorted to in the construction and arrangement of the parts without departing from the spirit of the invention or scope of the appended claim.

What I claim is:

In a signaling float, a casing having a bore, a member secured within said bore and formed with an insulated portion and a contact adapted for connection with a source of electrical power contained within the bore adjacent said member, a lamp socket carried by said portion and adapted to receive an electric lamp, said socket being formed with a resilient arm overlying said contact and normally spaced therefrom, and a rod within said casing connected to said arm and extending through the lower end of said casing for engagement with a fishing line whereby to move said arm into engagement with said contact upon downward movement of said line and illuminate said lamp to effect a signal.

EDGAR L. DIETRICH.